F. CLARK.
Grain-Shovel.
No. 63,139.
Patented Mar. 26, 1867.
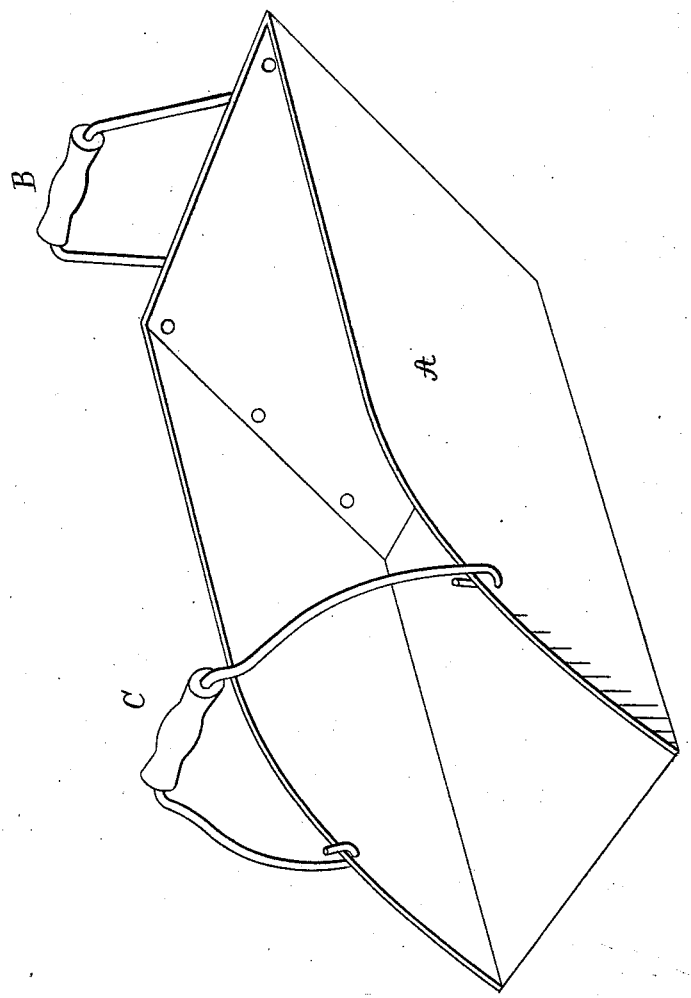
Witnesses:
Perry W. Clark
Amos Clark
Inventor:
Fayette Clark

United States Patent Office.

FAYETTE CLARK, OF MARCELLUS, NEW YORK,

Letters Patent No. 63,139, dated March 26, 1867.

IMPROVED GRAIN-SHOVEL HANDLER.

*The Schedule referred to in these Letters Patent and making part of the same.*

TO ALL WHOM IT MAY CONCERN:

Be it known that I, FAYETTE CLARK, of Marcellus, in the county of Onondaga, and State of New York, have invented a new and useful article called the Grain Handler; and I do hereby declare that the following is a full and exact description thereof, reference being had to the accompanying drawings, and to the letters of reference marked thereon.

The nature of my invention consists in making a grain shovel in such a shape as to enable the operator to move double the amount of grain in a given time than can be moved with an ordinary scoop-shovel. Its value as a grain handler has been thoroughly tested.

To enable others skilled in the art to make and use my invention, I will proceed to describe its construction and operation.

I construct my grain handler of iron of a suitable thickness, with a handle at the back end and a bail across near the forward end, with handle made in shape like the accompanying drawings.

In the accompanying drawings, A represents the body of the grain handler; B, the handle at the back end; C, the bail across near the forward end.

The mode of operation is to take hold of both handles, and use it right or left as an ordinary scoop-shovel.

What I claim as my invention, and desire to secure by Letters Patent, is—

The principle of putting the labor of handling grain equally upon both hands, it being in shape like the accompanying drawing, or any other shape substantially the same, and which will produce the same effect, namely, the placing of the weight of grain equally on both hands.

FAYETTE CLARK.

Witnesses:
  PERRY W. CLARK,
  AMOS CLARK.